April 28, 1953  E. C. FORINGER  2,636,652
CARRIER FOR MOBILE RADIO EQUIPMENT
Filed Sept. 10, 1948  3 Sheets-Sheet 1
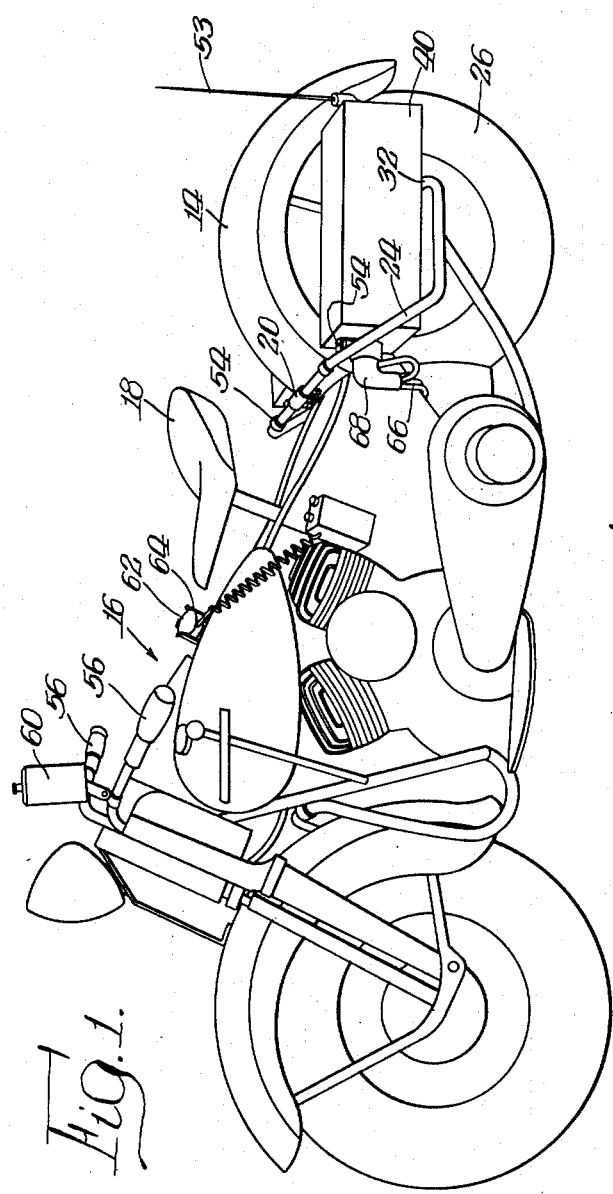
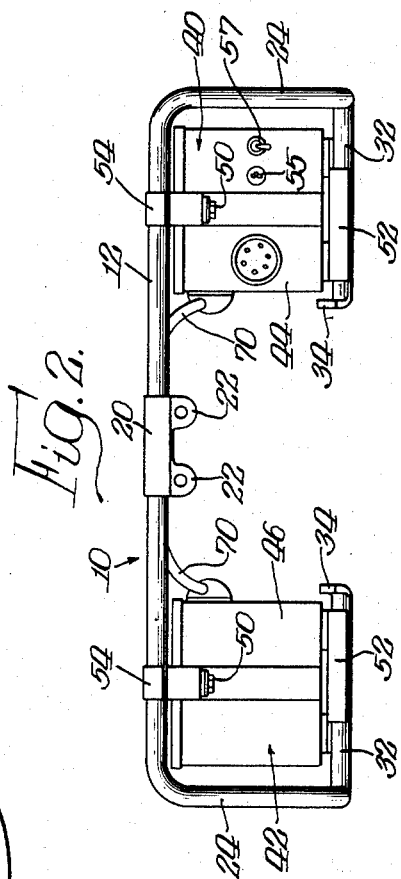
INVENTOR.
Edgar C. Foringer,
BY Foorman L. Mueller
Atty.

April 28, 1953     E. C. FORINGER     2,636,652
CARRIER FOR MOBILE RADIO EQUIPMENT
Filed Sept. 10, 1948     3 Sheets-Sheet 2
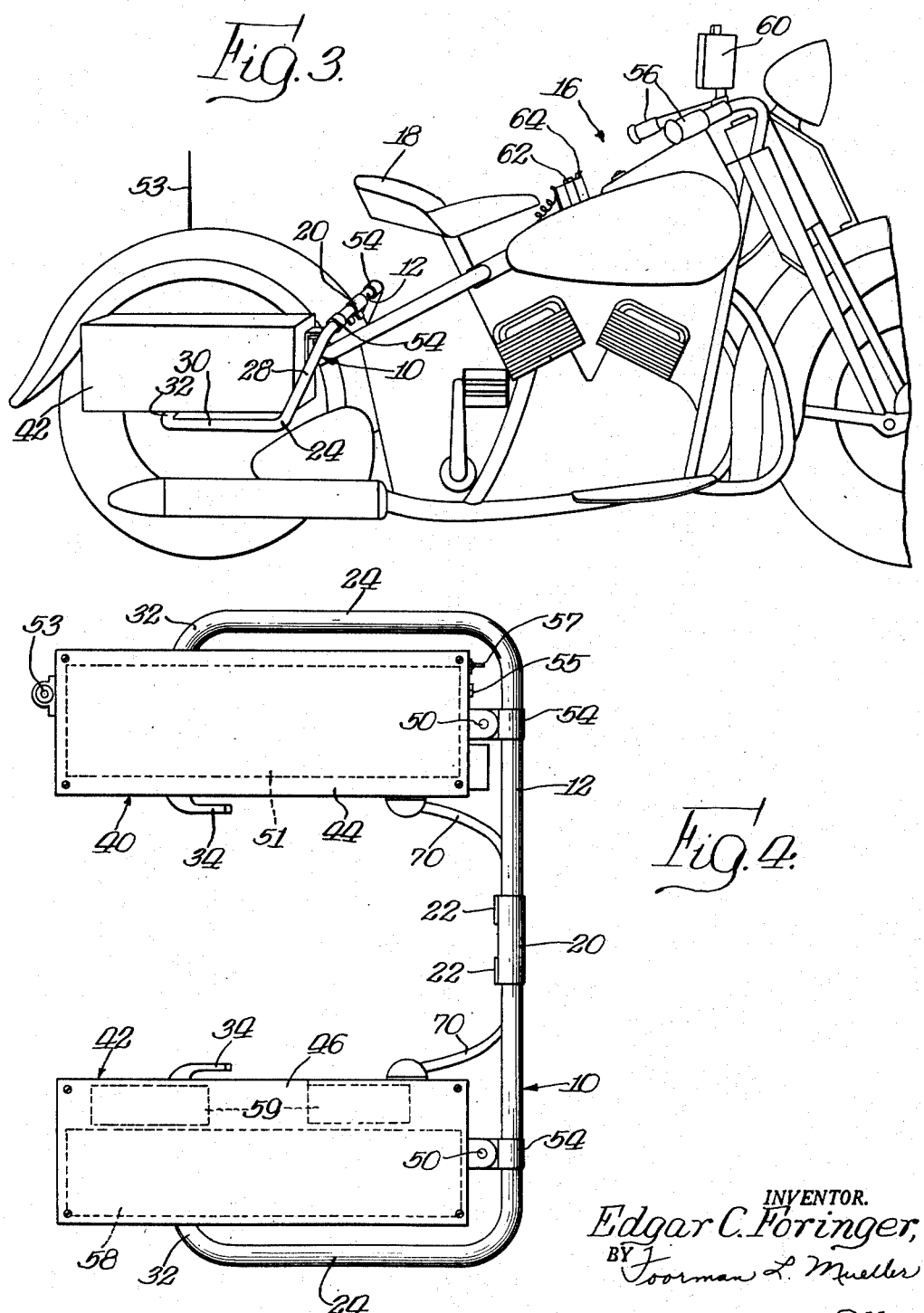
INVENTOR.
Edgar C. Foringer,
BY Foorman L. Mueller
Atty.

April 28, 1953     E. C. FORINGER     2,636,652
CARRIER FOR MOBILE RADIO EQUIPMENT
Filed Sept. 10, 1948     3 Sheets-Sheet 3
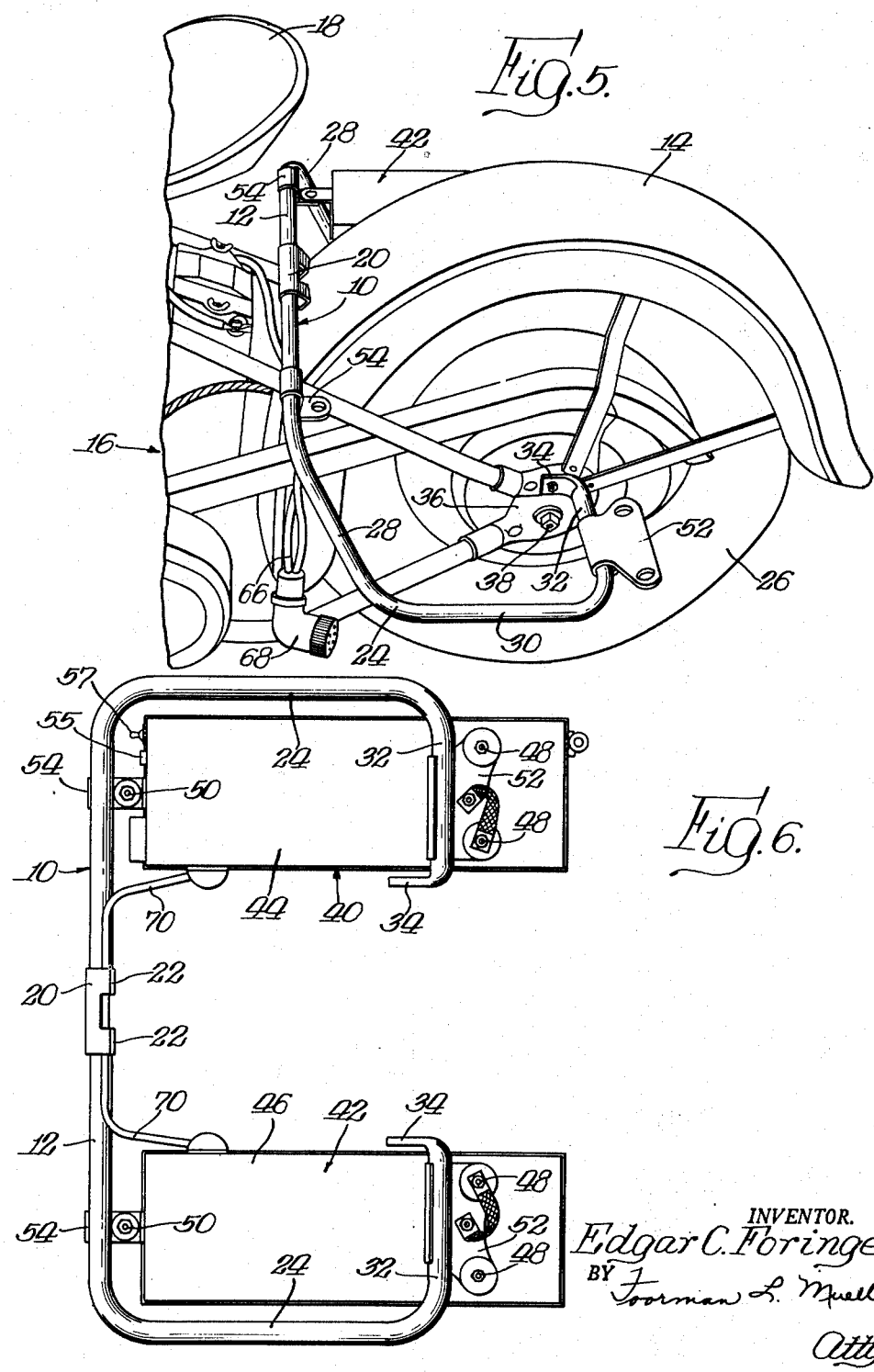

Patented Apr. 28, 1953

2,636,652

UNITED STATES PATENT OFFICE 2,636,652

CARRIER FOR MOBILE RADIO EQUIPMENT

Edgar C. Foringer, Melrose Park, Ill., assignor to Motorola, Inc., Chicago, Ill., a corporation of Illinois Application September 10, 1948, Serial No. 48,609

3 Claims. (Cl. 224—32)

This invention relates to mobile radio systems particularly those adapted for use on motorcycles and the like.

There has existed for some time a demand for radio communication equipment that can be installed on motorcycles. This demand has been met partially by the use of special three-wheeled motorcycles having compartments adapted to carry radio communication sets or the like. Such vehicles, however, are not as desirable as "solo" (two-wheeled) motorcycles in many instances. Highway police, for example, have great need for solo motorcycles equipped with communication sets or radio receivers. Such motorcycle units greatly increase the operating efficiency and usefulness of a police force or other body utilizing the same.

An object of the present invention is to enable radio equipment, such as communication sets, to be installed satisfactorily on solo motorcycles.

A further object is to provide an improved carrier of simple construction adapted for mounting on a solo motorcycle to support radio communication equipment or the like on the vehicle.

A still further object is to enable communication sets or other radio equipment to be installed on solo motorcycles without adversely affecting the center of gravity and balance of the vehicle, and without hampering the operator in any way.

A still further object is to provide a novel motorcycle radio system which is more feasible and economical than the present-day motorcycle-borne equipment.

A feature of the invention is the provision of a carrier in the form of a tubular framework or cradle which mounts on the motorcycle frame in back of the saddle, and which serves to support the components of the radio equipment on either side of the rear wheel. In a motorcycle communication set the transmitter is supported on one side of the wheel and the receiver on the other side. In a receiver-only model, one section may be utilized to carry a separate power pack, tools or other articles.

Another feature is the arrangement of the cradle in such fashion that portions thereof on each side of the rear wheel serve as crash bars to protect the radio equipment if the motorcycle should overturn.

The foregoing and other objects, features and advantages of the invention will be more apparent from a study of the following detailed description taken in conjunction with the accompanying drawings, wherein:

Fig. 1 is a side elevational view of a typical solo motorcycle equipped with a carrier for radio equipment, according to the principles of the invention;

Fig. 2 is a front elevational view of the carrier and components of the radio equipment supported thereby;

Fig. 3 is a partial elevational view showing the other side of the motorcycle;

Fig. 4 is a top view of the carrier and the radio equipment carried thereby;

Fig. 5 is a partial side perspective view of the motorcycle with one of the components of the radio set removed from the carrier; and Fig. 6 is a bottom view of the carrier and radio equipment.

In practicing the invention, the cradle or carrier which supports the radio equipment is formed out of strong tubular stock and comprises an essentially continuous, elongated member adapted for attachment at its middle and ends to the motorcycle frame. The middle portion of the cradle is fastened to the rear fender or mud guard of the motorcycle beneath the driver's saddle. The ends of the cradle are fastened to the motorcycle frame on either side of the rear wheel just above the axle. The boxes which house the radio set components (of which there are two) are mounted on the cradle, one on each side of the rear wheel. The front ends of these boxes or housings are connected to the middle or forward portion of the cradle, and the end portions of the cradle support the boxes from beneath and are connected thereto. The side portions of the cradle are spaced outwardly from the respective boxes a short distance. The space occupied by the equipment, from side to side, is less than the distance between the tips of the handle bars of the vehicle, and the length thereof is less than the diameter of the rear wheel.

The radio equipment carried by the cradle may comprise, for example, a communication set in which the transmitter and power pack are located on one side, and the receiver and other components (such as selective calling units) are on the other side of the rear wheel. The set is complete in every way, including the usual volume and squelch controls. Alternatively, a receiver-only installation may be utilized, as noted above.

Referring now to the drawings, the cradle or carrier generally designated 10 consists essentially of an elongated member formed out of tubular stock which is rigid and sturdy enough to withstand considerable shock and bending stress. The cradle 10 has a straight, horizontal middle portion 12 adapted to be fastened at its center to the rear fender or mud guard 14 of the motorcycle 16 just below the saddle 18. For this purpose there is provided on the middle portion 12 at the center thereof a mounting bracket 20 having depending apertured lugs 22 which are anchored by bolts or other suitable fastening devices to the rear fender 14. The cradle 10 has side portions 24 disposed on either side of the rear wheel 26 of the motorcycle, each portion 24 consisting of a downwardly inclined part 28 (Fig. 5) extending from an end of the middle portion 10, and a horizontal part 30 extending rearwardly from the lower end of the part 28. A horizontal bottom or end portion 32 extends transversely inward toward the wheel 26 from the end of each of the parts 30 and terminates in an apertured lug 34 which is bolted to the frame 36 of the motorcycle just above the rear axle 38.

From the foregoing it will be seen that the cradle 10 is connected at three places to the frame of the motorcycle, namely, at its middle portion to the rear fender 14, and at its lower end portions to the frame 36 on each side of the wheel 26 just above the rear axle 38. The transmitter and receiver components 40 and 42, respectively, of the radio equipment (assuming it is a communication set) are contained respectively in boxes or housings 44 and 46. Bolts 48 and 50 (Fig. 6) rigidly anchored in the bottom and front end, respectively, of each housing 44 or 46 are employed to fasten these housings to the cradle 10 on either side of the rear wheel 26 of the motorcycle. A bracket 52 secured to each of the end portions 32 of the carrier 10 has mounting holes through which the bolts 48 are inserted. Each of the bolts 50 is received in a bracket 54 secured to the middle portion 12 near an end thereof. It will be understood, of course, that suitable nuts are threaded onto the bolts 48 and 50 and are retained thereon by lock washers or the like.

In a typical installation the unit 40 may include a transmitter and power pack chassis 51 (Fig. 4), antenna 53, key-operated on-off switch 55, and standby switch 57. The unit 42 may include a receiver chassis 58 and auxiliary units 59 (Fig. 4) which may, for example, be components of a selective calling system.

The transmitter and receiver 40 and 42 of the communication set are supported firmly and securely by the cradle 10 on the frame of the motorcycle 16. The entire width of the installation from one side 24 to the other side 24 of the cradle is less than the distance between the tips of the handle bars 56 of the motorcycle. The components are well to the rear of, and below, the driver or operator of the vehicle, closely adjacent to the rear wheel 26 where they do not obstruct the operator's freedom of movement or his view rearwardly. Each of the housings 44 and 46 is less in length than the diameter of the wheel 26. The side portions 24 of the cradle 12 are spaced outwardly from the outer sides of the housings 44 and 46, and they tend to protect the equipment contained therein from injury if the motorcycle should happen to overturn. Hence, the cradle 10 serves not only to support the equipment but also to protect it from damage in the event of a crash.

The speaker and control unit 60 is supported in suitable fashion by the handle bars 56 in front of the operator. The controls may include a squelch control and a volume control. The microphone 62 normally rests on a bracket 64 arranged on the frame of the vehicle just in front of the saddle 18, where it can easily be grasped and lifted by the operator. Connections from the vehicle battery, speaker 60 and microphone 62 to the equipment carried at the rear of the motorcycle are made through a cable 66 and a cable connector 68, which attaches to the front of the transmitter unit 40. Another cable 70 interconnecting the transmitter 40 and receiver 42 extends along the straight middle portion 12 of the cradle 10 and is taped thereto.

The cradle 10 may be used also to support a receiver-only installation. In this case the receiver (such as 42) is supported on one side of the rear wheel 26 by the cradle 10, and the transmitter housing usually located on the other side of the wheel may be replaced by a box for tools or accessories.

From the foregoing description it will be appreciated that I have provided a novel and useful carrier 10 which makes possible a solo motorcycle radio installation that is practical and efficient. A typical installation of this kind weighs a total of about 45 lbs. and is properly proportioned and located so as not to adversely affect the center of gravity and balance of the vehicle. The equipment is not cumbersome, and it can be readily mounted on and detached from the vehicle. The illustrated cradle or carrier 10 is inexpensive and sturdy and greatly increases the utility of the motorcycle, particularly when used by an organization such as a police force.

While there has been disclosed a preferred embodiment of the invention, the subject matter claimed herein is not restricted to said embodiment but includes all variations and modifications thereof coming within the spirit of the novel teachings set forth hereinabove.

I claim:

1. Apparatus for mounting equipment on a solo motorcycle having a frame structure, a rear wheel and a fender for said wheel, said apparatus comprising a single rigid cradle member including a middle portion positioned adjacent said rear fender and extending transversely thereof, side portions extending rearwardly and downwardly from the ends of said middle portion, and inturned end portions positioned in engagement with the frame of said motorcycle near the center of said rear wheel, mounting means securing said middle portion to the fender, means securing said end portions to the frame structure, a pair of elongated housings supported by said cradle member on opposite sides of the rear wheel, a pair of brackets supported on said middle portion of said cradle member on opposite sides of said fender, a pair of mounting means individually secured to said brackets and to said housings at the front ends and adjacent the tops thereof, a second pair of brackets individually supported on said end portions of said cradle member and positioned under said housings adjacent the rear ends thereof, and a pair of mounting means supporting each of said housings from the bracket positioned thereunder to provide a three point support for each of said housings.

2. Apparatus for mounting equipment on a solo motorcycle having a frame structure, a rear wheel and a fender for said wheel, said apparatus comprising a single rigid cradle member including a middle portion secured to said fender and extending transversely thereof, side portions extending rearwardly and downwardly from the ends of said middle portion, and inturned end portions secured to the frame of said motorcycle near the center of said rear wheel, an elongated housing supported by said cradle member at one side of the rear wheel, and means for supporting said housing comprising a member secured to the housing and to the middle portion of the cradle member laterally of the fender and a second member secured to one of said end portions of said cradle member and secured to said housing at two points spaced longitudinally of said one end portion.

3. Apparatus for mounting radio equipment on a solo motorcycle having a frame structure, a rear wheel and a fender for said wheel, said apparatus including in combination, a single rigid cradle member, a pair of elongated housings for enclosing radio equipment supported by said cradle member on opposite sides of the rear wheel, said cradle member including a middle portion positioned adjacent the front of said rear fender and extending transversely thereof beyond said housings, side portions extending rearwardly from the ends of said middle portion along the outer side of said housings, and inturned end portions extending under said housings and in engagement with the frame structure of said motorcycle near the center of said rear wheel; mounting means securing said middle portion of said cradle member to the fender, means securing said end portions of said cradle member to the frame structure, mounting means supporting the front ends of said housings on said middle portion of said cradle member, and additional mounting means supporting said housings adjacent the rear ends thereof on said end portions of said cradle member.

EDGAR C. FORINGER.

References Cited in the file of this patent

UNITED STATES PATENTS

| Number | Name | Date |
|---|---|---|
| 2,109,315 | Harley | Feb. 22, 1938 |
| 2,126,752 | Devine et al. | Aug. 16, 1938 |